(12) United States Patent
Hopkins

(10) Patent No.: US 7,494,703 B2
(45) Date of Patent: *Feb. 24, 2009

(54) HIGH MODULUS THERMOPLASTIC FILMS

(76) Inventor: Tom Hopkins, P.O. Box 25176, Greenville, SC (US) 29616

( * ) Notice: Subject to any disclaimer, the term of this patent is extended or adjusted under 35 U.S.C. 154(b) by 783 days.

This patent is subject to a terminal disclaimer.

(21) Appl. No.: 10/728,321

(22) Filed: Dec. 4, 2003

(65) Prior Publication Data
US 2005/0124491 A1 Jun. 9, 2005

(51) Int. Cl.
B32B 17/02 (2006.01)
B41M 5/20 (2006.01)

(52) U.S. Cl. .................. 428/220; 428/35.7; 428/34.6; 428/322.2; 428/212; 427/152; 503/200; 264/78

(58) Field of Classification Search ............. 428/35.7, 428/34.6, 322.2, 220, 212; 427/152; 264/78; 503/200
See application file for complete search history.

(56) References Cited

U.S. PATENT DOCUMENTS

| | | | |
|---|---|---|---|
| 3,004,284 A * | 10/1961 | Limbach | 26/72 |
| 3,958,064 A | 5/1976 | Brekken et al. | |
| 4,325,850 A | 4/1982 | Mueller | |
| 4,612,721 A | 9/1986 | Fumei | |
| 4,652,409 A | 3/1987 | Leese et al. | |
| 4,941,947 A | 7/1990 | Guckert et al. | |
| 4,996,182 A | 2/1991 | Matsui et al. | |
| 5,047,121 A | 9/1991 | Kochar | |
| 5,072,671 A | 12/1991 | Schneider et al. | |
| 5,079,097 A | 1/1992 | Sasaki et al. | |
| 5,089,316 A | 2/1992 | Sasaki et al. | |
| 5,229,218 A | 7/1993 | Dobreski | |
| 5,242,546 A | 9/1993 | Evans et al. | |
| 5,268,074 A | 12/1993 | Brooks et al. | |
| 5,328,749 A | 7/1994 | Noda et al. | |
| 5,346,763 A | 9/1994 | Balloni et al. | |
| 5,366,854 A | 11/1994 | Miyoshi et al. | |
| 5,474,968 A | 12/1995 | Norimatsu | |
| 5,494,745 A | 2/1996 | Vander Velden et al. | |
| 6,284,177 B1 | 9/2001 | Ewing | |
| 6,407,034 B1 | 6/2002 | Ewing | |
| 6,607,834 B2 * | 8/2003 | Davis et al. | 428/457 |

* cited by examiner

Primary Examiner—Keith D Hendricks
Assistant Examiner—Lawrence D Ferguson
(74) Attorney, Agent, or Firm—Leigh P Gregory

(57) ABSTRACT

A thermally printable commercially functional cash register tape produced from a thin machine direction oriented, heat stabilized, multi-layer, coextruded thermoplastic film is described. This thermoplastic tape replaces the currently used paper cash register tape. It will accept printing, has sufficient machine direction stiffness and sufficiently reduced surface electrical charges to function in conventional commercial cash register printers. The thermoplastic tape is much thinner than the conventional paper tape so a roll of the plastic register tape contains about 4.7 times the paper length of a typical cash register roll.

19 Claims, 1 Drawing Sheet

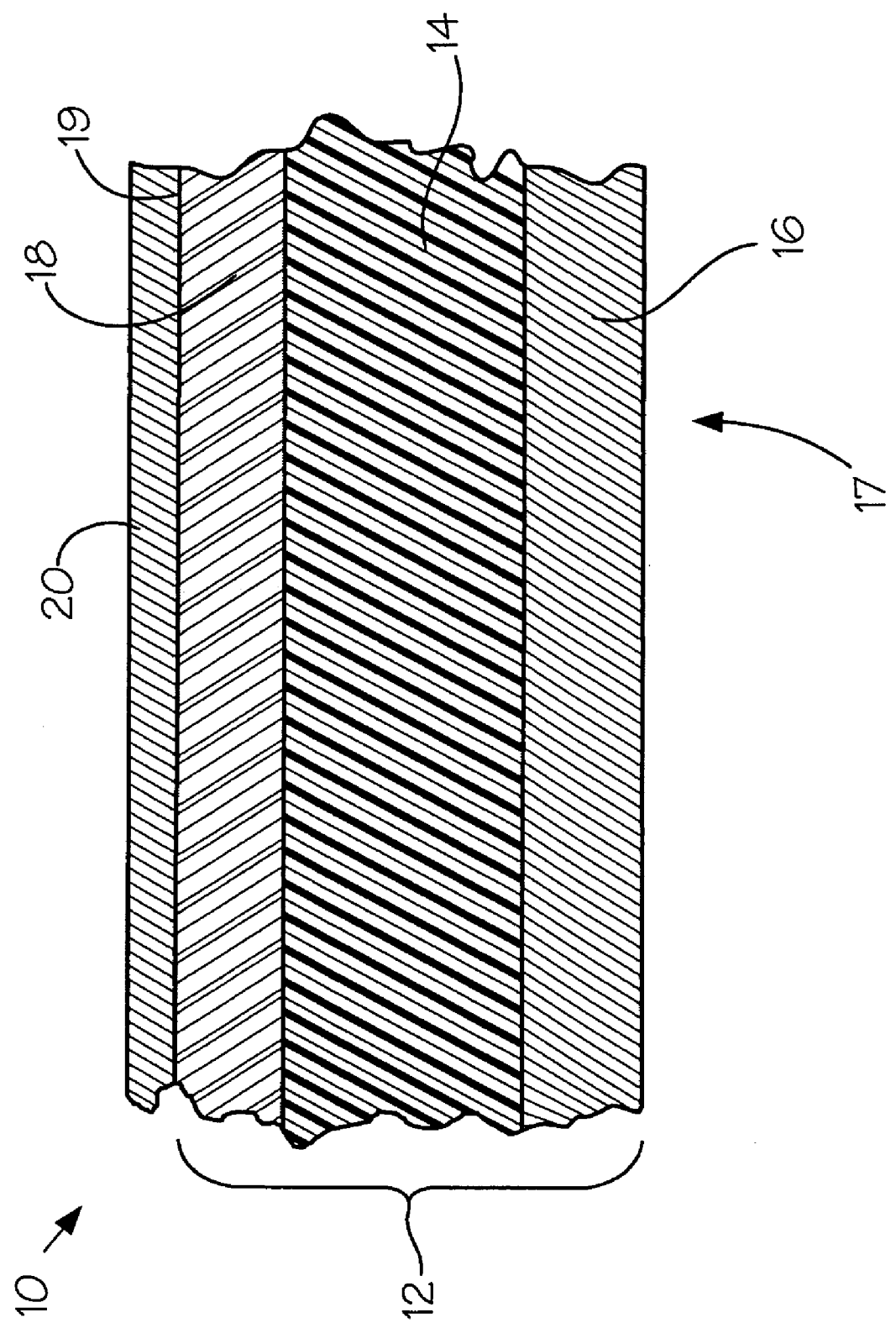

HIGH MODULUS THERMOPLASTIC FILMS

FIELD OF THE INVENTION

The present invention is generally directed to thermoplastic films of sufficient stiffness and opacity for use in high speed printing equipment. Specifically, this invention describes an improved cash register receipt tape produced from a thin, multi-layer, coextruded, machine direction oriented, heat stabilized thermoplastic film.

BACKGROUND OF THE INVENTION

Currently, point-of-sale cash register receipts are printed on a paper tape using inkjet, thermal image or ribbon printers. Numerous patents describe inventions of plastic films to replace these paper tape receipts. The primary focus for many of these inventions is to describe a plastic printer register receipt that is "co-recyclable" with existing plastic shopping bags.

For example, U.S. Pat. No. 5,229,218 to Dobreski presents a general description of plastic materials for use as a register receipt tape that is claimed to be recyclable. The concepts embodied in the Dobreski patent were continued in U.S. Pat. No. 6,284,177 to Ewing, which similarly provides a somewhat general description of a recyclable plastic register tape. In the Background section, the '177 patent notes that the Dobreski patent, "does not provide sufficient details to select a specific thermoplastic material which is economical, of sufficient strength and which can be reliably fabricated into a printable film."

U.S. Pat. No. 6,407,034, also to Ewing, discloses a recyclable register tape in which the base sheet materials and thermally printed media are combined prior to production of the film.

The above-described prior art laudably recognizes the benefit of providing a thin, thermoplastic register tape as a replacement for prior paper tapes. Specifically, the current commonly used paper tape ranges in thickness from 2.1 to 2.5 mils. A cash register paper tape roll 3-inches in diameter wound on a ⅞-in. diameter core contains 230 feet of paper register tape. A 3 inch diameter roll of a 0.5 mil thick thermoplastic tape wound on a ⅞ in. diameter core contains 1,077.9 feet of thermoplastic register tape or 4.7 times the length included in a similar diameter paper register tape roll. The thermoplastic tape therefore should provide numerous economies to firms and individuals using cash register printers and receipt printers since the additional tape length available in the thermoplastic tape roll should result in less frequent roll changes at the cash register or receipt printer and less storage space for register tape roll inventory. However, the prior art to date has failed to yield a thermoplastic tape having adequate physical properties to serve as a drop-in replacement for current paper register tapes.

SUMMARY OF THE INVENTION

It is therefore one purpose of the present invention to provide a thermoplastic register or receipt tape having sufficient stiffness to run in current receipt printers. It is a further purpose of the present invention to provide such a thermoplastic film with adequate antistatic properties for printing. Specifically the film must have sufficient stiffness in the machine direction and it must also be capable of dissipating static electrical charges that accumulate on the film surface as a result of the film encountering and separating from printer rollers as it moves through the printer during the printing process. Many of the commercial receipt printers are constructed with plastic cases that may develop high static electricity charges. If the register film is not relatively static free, it may be attracted to the case causing the film to jam during the printing process. Similarly a film with insufficient machine direction stiffness will jam during the printing process.

Accordingly, the present invention is directed to a multi-layer, oriented thermoplastic composite for use as a register or receipt tape which includes a film having a first outer film surface and a second outer film surface, the film including a core layer, and at least a first outer layer having an outermost surface which is the first outer film surface, the first outer layer including a non-migratory anti-static additive, and a heat sensitive, thermal image coating on the second outer film surface, wherein at least one outer layer includes a pigment and wherein the composite has a 1% secant modulus in the machine direction of at least about 150,000 psi, preferably at least about 200,000 psi. In one embodiment the second outer film surface is the outermost surface of the core layer opposite to the first outer layer. However, in a preferred embodiment the film includes a second outer layer that has an outermost surface and that outermost surface is the second outer film surface bearing the heat sensitive, thermal image coating. The composite has a thickness of from about 0.35 mils to about 1.5 mils, preferably from about 0.50 mils to about 0.75 mils. If the core layer is sandwiched between first and second outer layers, as is preferred, the core layer may include a cavitation promoting additive. At least one of the layers includes a polymer such as polyethylene, polypropylene, linear low density polyethylene, polystyrene or polyester. In one embodiment the film may be biaxially oriented. In a preferred embodiment the film is uniaxially oriented in the machine direction. Either way, following orientation the film is rendered essentially non-heat shrinkable by a heat treatment such as annealing.

Further, the present invention is directed to an oriented thermoplastic composite for use as a register or receipt tape which includes a film having a first outer film surface and a second outer film surface, the film having at least a core layer, with an anti-static coating on the first outer film surface and a heat sensitive, thermal image coating on the second outer film surface, wherein at least one composite component includes a pigment and wherein the composite has a 1% secant modulus in the machine direction of at least 150,000 psi, preferably at least 200,000 psi. In one embodiment the film includes an outer layer having an outermost surface which is the first outer film surface bearing the anti-static coating. In one embodiment the film includes an outer layer having an outermost surface which is the second outer film surface bearing the heat sensitive, thermal image coating. The overall composite has a thickness of from about 0.35 mils to about 1.5 mils, preferably from about 0.50 mils to about 0.75 mils. At least one layer of the film includes a polymer such as polyethylene, polypropylene, linear low density polyethylene, polystyrene or polyester. In one embodiment the film is biaxially oriented. However, in a preferred embodiment the film is uniaxially oriented in the machine direction. Either way, the following orientation the film is rendered essentially non-heat shrinkable by a heat treatment such as annealing.

The present invention also is directed to a method for making a thermoplastic composite suitable for use as a register or receipt tape, which includes the steps of:

a) coextruding a multilayer film having a first outer film surface and a second outer film surface, the film including a core layer, and at least a first outer layer having an outermost surface which is the first outer film surface, the first outer layer having a non-migratory anti-static additive, and at least one outer layer having a pigment;

b) orienting the film;

c) annealing the film; and d) applying a heat sensitive, thermal image layer to the second outer film surface.

In one embodiment the step of orienting involves biaxially orienting. For such embodiment it is preferred that the product of the machine direction and transverse direction stretch ratios is from about 2.0× to about 50×. However, it is preferred that the step of orienting is performed by uniaxially orienting the film in the machine direction, preferably wherein the machine direction stretch ratio is in the range of from about 1.5× to about 10.0×. In one embodiment the step of coextruding is performed in a blown film process. In another embodiment the step of coextruding is performed in a cast film process.

BRIEF DESCRIPTION OF THE FIGURE OF THE DRAWING

The present invention will be described with reference to the following drawing:

FIG. 1 is a schematic, cross-sectional view of a thermoplastic printing or register tape in accordance with the present invention.

DETAILED DESCRIPTION OF THE PREFERRED EMBODIMENTS

Generally, the present invention is directed to a multilayer, oriented thermoplastic composite for use as a register or receipt tape. FIG. 1 of the drawing illustrates a preferred embodiment wherein the composite 10 is formed of a film 12 having at least one outer coating 20. As shown in the embodiment of FIG. 1, film 12 includes a core layer 14, a first outer layer 16, and a second outer layer 18. First outer layer 16 has an outermost surface which is a first outer film surface 17 and second outer layer 18 has an outermost surface which is a second outer film surface 19. In this embodiment, outer coating 20 has been applied to second outer film surface 19. The overall composite preferably has a thickness in the range of from about 0.35 mils to about 1.5 mils, preferably from about 0.50 mils to about 0.75 mils.

Turning to the specific function of each composite component, the core layer of the film provides the film bulk, the first outer layer provides anti-static properties, and the outer coating 20 provides a printable surface. The second outer layer 18 of the film is preferred but optional. Outer coating 20 may be applied directly to an outer surface of the core layer. If outer layer 18 is present it preferably includes a pigment which renders the film opaque in order to enhance the visibility of the printing. If outer layer 18 is not present at least one of the remaining film components should include a pigment. A preferred pigment for use in accordance with the present invention is titanium dioxide.

The core layer may be formed of any of a number of thermoplastic polymers or polymer blends. Preferred polymers for use in the core layer include polyethylene homopolymers and copolymers, including low density polyethylene and high density polyethylene, polypropylene homopolymers and copolymers, linear low density polyethylene, polystyrene or polyester. However, any suitable thermoplastic polymer or polymers may be employed. The core layer preferably comprises from about 50% to about 85% of the overall film thickness.

Thus, core layer 14 preferably includes a cavitation promoting additive such as Ampacet 110881, supplied by Ampacet Corp., Tarrytown, N.Y., which is calcium carbonate and titanium dioxide in a high density polyethylene carrier. With such an additive a relatively thick core layer may be formed with a reduced volume of polymer. However, a cavitation promoting additive only may be employed if both outer film layers are present. Otherwise, the additive would render the outer surface of the core layer, which would comprise an outer film surface, unsuitable for receiving a coating.

Optionally, the core layer may include a pigment. Inclusion in at least one of the composite components of a sufficient amount of a pigment to render the overall composite opaque is required. However, a reduced amount of pigment may be employed if it is incorporated into one of the thinner layers or a thin coating. Thus, from an economic perspective, if the core layer is the thickest layer, it may be the least preferred composite component for carrying the pigment.

The first outer layer 16 provides anti-static properties to the film. Generally, there are two classes of anti-static agents, migratory and non-migratory, that can be used to dissipate static electricity charges that accumulate on the surfaces of plastic films. Each class has advantages and disadvantages. Migratory additives, either amine or non-amine, are inexpensive compared to non-migratory additives and work by diffusing to the film surface after the film is blown or cast. Once on the surface, they attract atmospheric moisture to the film surface to dissipate static electricity charges. This type of additive is not effective in very dry climates or in conditions where there is insufficient moisture in the air. Accordingly, non-migratory additives, which work by forming a continuous matrix that is electrically conductive within the film structure, are preferred for use in accordance with the present invention. A preferred non-migratory anti-static additive for use in accordance with the present invention is Antistat PE MB 101710, a polyethylene-based antistatic additive supplied by Ampacet Corp., Tarrytown, N.Y. In order for a non-migratory additive to be economically viable, it becomes necessary to minimize the amount of additive employed by limiting the inclusion of this additive to a thin surface layer. Thus, it is preferred that first outer layer 16 which carries the non-migratory additive comprises from about 7.5% to about 25% of the overall thickness of film 12.

In a less preferred embodiment the composite may include an anti-static coating. Such coating may be applied to the outer film surface 17 or the first outer layer 16 may be omitted and the anti-static coating may be applied directly to an outermost surface of the core layer.

In accordance with the present invention, outer coating 20, which provides a printable surface to the composite, is opposite to the anti-static layer or coating because the "back," or non-printing, surface of the composite is subjected to the higher degree of friction as the tape passes through the printer. Coating 20 is a heat sensitive, thermal image coating such as Protecoat 8468, supplied by NuCoat, Inc., Plymouth, Minn. The thermal image coating may be applied directly to an outer surface of the core layer. However, preferably film 12 includes second outer layer 18 and the coating is applied to outer film surface 19. Preferably, second outer layer 18 comprises from about 7.5% to about 25% of the overall film thickness. Preferably, second outer layer 18 includes a pigment in sufficient quantity to render the composite opaque. However, the pigment may be incorporated into the composite in any component including coating 20.

The present composite is preferably made by forming the film, orienting the film, and then applying the thermal image coating and, if one is employed, an anti-static coating. Preferably, the film is formed by coextrusion of the layers. If the film only comprises a monolayer core then preferably it is extruded. Although coextrusion is the preferred means for forming the present preferred multilayer film, other means of film formation also are within the scope of the present invention, such as lamination, coating or extrusion coating. The film may be coextruded by any conventional means such as a blown film process or a cast film process.

Thereafter, the film is oriented. Orientation is necessary to the present invention in order to render the film sufficiently stiff to run through a register or printer. It should be noted that as the film thickness is decreased to a level that is commercially cost effective, the film stiffness decreases substantially. Thus, although a 1-mil thick static free film may have sufficient machine direction stiffness, a thermoplastic film with this thickness is not economically viable as a register tape. It is therefore necessary to reduce the film thickness to reach a film cost per unit area which is economically viable and which has sufficient machine direction stiffness to function in commercial register printers. Accordingly, the present film, which preferably has a thickness of from about 0.50 mils to about 0.75 mils, must have a 1% secant modulus in the machine direction of at least about 150,000 psi preferably at least about 200,000 psi. In order to achieve this stiffness, preferably the film is uniaxially oriented in the machine direction with a machine direction stretch ratio in the range of from about 1.5× to about 10.0×. This degree of orientation improves machine direction stiffness by 2 to 5 times as compared to a non-oriented film. Alternatively, the film may be biaxially oriented such that the product of the machine direction and transverse direction stretch ratios is from about 2.0× to about 50×. In accordance with the present invention, orientation may take place in one step or in a series of stretching steps. Regardless of the type of orientation, thereafter the film must be thermally stabilized, i.e., annealed or heat set, in order to render it essentially non-heat shrinkable. Orientation and annealing may be performed either in-line out-of-line with coextrusion.

Following orientation and heat stabilization, the outer film surface 19 preferably is subjected to a surface treatment such as, preferably, corona discharge, flame or chemical treatment, prior to application of the thermal image coating. If an anti-static coating is employed, the surface onto which it is applied preferably is subjected to a surface treatment prior to coating as well. Such surface treatment is employed to ensure adherence of the coating to the outer surface of the film.

Thereafter, outer coating 20 and, optionally, an anti-static coating are applied in a conventional manner.

Following extrusion, orientation, heat stabilization, surface adhesion treatment and coating, the film is slit and wound into roll sizes useful in commercial register printers. All process steps may be performed either in-line or out-of-line with the preceding step.

In making the present composite matting compound is not included in any layer. The materials for each film layer are preferably dry or melt blended prior to extrusion to improve uniformity. Although not required, intermediate layers, such as tie layers or other structural layers, may be included in the present film structure.

Thus, the present invention advantageously provides a thermoplastic register or receipt tape of sufficiently reduced thickness to be commercially desirable for replacement of a conventional paper tape, which is of sufficient stiffness to run through a conventional printer and which has adequate anti-static properties for printing. However, it should be noted that if a non-migratory anti-static additive is included in the first outer layer 16, as is preferred, one might expect that the subsequent orientation, which is necessary to improve stiffness and to reduce the film thickness, might disrupt the non-migratory anti-static additive matrix structure such that the anti-static properties of the film would be lost. It has been unexpectedly found in accordance with the present invention that this is not the case. For example, the 2.5-mil thick high density polyethylene film of Example 1, below, was produced with a non-migratory antistatic additive in the outer layer in a conventional blown film process. The layer thickness ratios for this structure were 10% for the first outer layer, 80% for the core layer, and 10% for the second outer layer. The surface resistivity of the first outer layer of this film was $10^{10}$ ohms. The surface resistivity of the second outer layer that did not contain an anti-static additive was $10^{12}$ ohms. This film was stretched in the machine direction 5× to reach a final film thickness of 0.5 mils. There was no transverse direction stretch. The surface resistivity of the first outer layer after stretching was $10^{10}$ ohms while the second outer layer remained at $10^{12}$ ohms. The machine direction stretch therefore did not disrupt the anti-static additive matrix in the first outer layer and did not disturb the overall anti-static property of the film.

Further illustrations of the present invention are provided in the two examples cited below.

EXAMPLE 1

A first outer layer, a core layer, and a second outer layer were coextruded through a circular die and blown to form a three layer self-supporting film having a thickness of 2.5 mils. The layer percent thickness ratio was 10:80:10, respectively. The first outer layer was comprised of 58% high density polyethylene, 2% titanium dioxide and 40% non-migratory anti-static additive. The core layer was comprised of 100% high density polyethylene. The second outer layer was comprised of 98% high density polyethylene and 2% titanium dioxide. The structure was coextruded on a conventional blown film line using a 4:1 blow up ratio.

Wound film from the above extrusion operation was then stretched in a conventional roll-to-roll stretching unit where it was subjected to a 5:1 machine direction stretch ratio. Following stretching, the second outer layer was corona treated prior to winding the now 0.5 mil thick machine direction oriented film. There was no transverse stretch employed. Corona treated wound film from the stretching operation was then coated with a heat sensitive, thermal image coating on the corona treated second outer layer surface. Following coating, the film was then slit into roll sizes suitable for use in commercial register printers.

The resulting film structure had the following parameters and characteristics:

| | |
|---|---|
| Nominal thickness: | 0.5 mils |
| 1% secant modulus in the machine direction: | approx. 400,000 psi |
| Area factor: | approx. 60,000 sq. in./pound |
| Surface resistivity: | |
| First outer layer: | $10^{10}$ ohms |
| Second outer layer: | >$10^{12}$ ohms |

A film produced according to this example was tested in an NCR point of sale printer, Class 7193, Model 3205-9001, where it ran through repeated printing cycles without jamming. A non-oriented film, also having a 0.5 mil thickness and produced using the same materials and additives, was tested in the same printer. This film, which had a 1% machine direction secant modulus of approximately 200,000, psi jammed repeatedly after less than five printing cycles.

EXAMPLE 2

A 4.0 mil thick high density polyethylene film in accordance with the present invention was produced with a non-migratory anti-static additive in the first outer layer in a conventional blown film process. The film had the same layer-by-layer composition and percent layer thicknesses as the film of Example 1. The surface resistivity of the first layer was $10^{10}$ ohms. The surface resistivity of the second outer layer that did not contain an anti-static additive was $10^{12}$ ohms. This film was stretched in the machine direction 8× to reach a final film thickness of 0.5 mils. There was no transverse direction stretch. The surface resistivity of first outer layer after stretching was $10^{11}$ ohms while the second outer layer remained at $10^{12}$ ohms. Even at this higher level machine direction stretch, the anti-static additive matrix in the first outer layer was not disrupted to the point where the anti-static property of the film was lost.

While the disclosed process has been described according to its preferred embodiments, those of ordinary skill in the art will understand that numerous other embodiments have been enabled by the foregoing disclosure. Accordingly, the foregoing embodiments are merely exemplary of the present invention. Modifications, omissions, substitutions and rearrangements may be made to the foregoing embodiments without departing from the invention as set forth in the appended claims.

I claim:

1. A multilayer, oriented thermoplastic composite for use as a register or receipt tape comprising:
   an essentially non-heat shrinkable film having a first outer film surface and a second outer film surface, the film comprising a core layer, and at least a first outer layer having an outermost surface comprising the first outer film surface;
   the first outer layer comprising a non-migratory anti-static additive; and
   a heat sensitive, thermal image coating on the second outer film surface;
   wherein at least one outer layer comprises a pigment and wherein the composite has a 1% secant modulus in the machine direction of at least 150,000 psi.

2. A composite as set forth in claim 1 wherein the second outer film surface comprises an outermost surface of the core layer opposite to the first outer layer.

3. A composite as set forth in claim 1 further comprising a second outer layer having an outermost surface and wherein the outermost surface of the second outer layer comprises the second outer film surface bearing the heat sensitive, thermal image coating.

4. A composite as set forth in claim 1 having a thickness of from about 0.35 mils to about 1.5 mils.

5. A composite as set forth in claim 4 having a thickness of from about 0.50 mils to about 0.75 mils.

6. A composite as set forth in claim 3 wherein the core layer further comprises a cavitation promoting additive.

7. A composite as set forth in claim 1 having a 1% secant modulus in the machine direction of at least about 200,000 psi.

8. A composite as set forth in claim 1 wherein at least one of the layers comprises a polymer selected from the group consisting essentially of polyethylene, polypropylene, linear low density polyethylene, polystyrene and polyester.

9. A composite as set forth in claim 1 wherein the film is biaxially oriented.

10. A composite as set forth in claim 1 wherein the film is uniaxially oriented in the machine direction.

11. An oriented thermoplastic composite for use as a register or receipt tape comprising:
    an essentially non-heat shrinkable film having a first outer film surface and a second outer film surface, the film comprising at least a core layer;
    an anti-static coating on the first outer film surface; and
    a heat sensitive, thermal image coating on the second outer film surface;
    wherein at least one composite component comprises a pigment and wherein the composite has a 1% secant modulus in the machine direction of at least 150,000 psi.

12. A composite as set forth in claim 11 further comprising an outer layer having an outermost surface comprising the first outer film surface bearing the anti-static coating.

13. A composite as set forth in claim 11 further comprising an outer layer having an outermost surface comprising the second outer film surface bearing the heat sensitive, thermal image coating.

14. A composite as set forth in claim 11 having a thickness of from about 0.35 mils to about 1.5 mils.

15. A composite as set forth in claim 14 having a thickness of from about 0.50 mils to about 0.75 mils.

16. A composite as set forth in claim 11 having a 1% secant modulus in the machine direction of at least about 200,000 psi.

17. A composite as set forth in claim 11 wherein at least one layer comprises a polymer selected from the group consisting essentially of polyethylene, polypropylene, linear low density polyethylene, polystyrene and polyester.

18. A composite as set forth in claim 11 wherein the film is biaxially oriented.

19. A composite as set forth in claim 11 wherein the film is uniaxially oriented in the machine direction.

* * * * *